United States Patent

Bryan et al.

[11] Patent Number: 6,166,095
[45] Date of Patent: *Dec. 26, 2000

[54] METHOD OF PREPARING A DRILLING FLUID COMPRISING STRUCTURED SURFACTANTS

[75] Inventors: Edward Bryan, Stourbridge; Boyd William Grover, Bromsgrove; William John Nicholson, Halesowen, all of United Kingdom

[73] Assignee: Albright & Wilson UK Limited, West Midlands, United Kingdom

[ * ] Notice: This patent issued on a continued prosecution application filed under 37 CFR 1.53(d), and is subject to the twenty year patent term provisions of 35 U.S.C. 154(a)(2).

[21] Appl. No.: 08/730,566

[22] Filed: Oct. 15, 1996

Related U.S. Application Data

[63] Continuation of application No. 08/356,690, Dec. 15, 1994, abandoned.

[30] Foreign Application Priority Data

| Dec. 15, 1993 | [GB] | United Kingdom | 9325626 |
| Apr. 5, 1994 | [GB] | United Kingdom | 9406678 |
| May 9, 1994 | [GB] | United Kingdom | 9409175 |

[51] Int. Cl.$^7$ ................................................. B01F 17/00
[52] U.S. Cl. .................. 516/59; 516/58; 516/76; 516/78; 507/134; 507/135; 507/136; 507/140
[58] Field of Search ..................... 510/492, 421, 510/422, 424, 426, 420; 507/134, 135, 136, 140, 58; 516/59, 76, 78

[56] References Cited

U.S. PATENT DOCUMENTS

| 4,515,704 | 5/1985 | Akred et al. . | |
| 4,618,446 | 10/1986 | Haslop et al. | 252/135 |
| 4,659,497 | 4/1987 | Akred et al. . | |
| 4,793,943 | 12/1988 | Haslop et al. . | |
| 4,871,467 | 10/1989 | Akred et al. . | |
| 5,108,643 | 4/1992 | Loth et al. | 252/174.11 |
| 5,198,353 | 3/1993 | Hawkins et al. . | |
| 5,393,468 | 2/1995 | Erilli et al. | 352/550 |
| 5,415,813 | 5/1995 | Misselyn et al. | 252/547 |
| 5,807,810 | 9/1998 | Blezard et al. . | |
| 5,964,692 | 10/1999 | Blezard et al. | 516/59 |

FOREIGN PATENT DOCUMENTS

| 0 151 884 | 8/1985 | European Pat. Off. . |
| 0 430 602 A1 | 5/1991 | European Pat. Off. . |
| 0 452 106 A2 | 10/1991 | European Pat. Off. . |
| 0 487 169 A1 | 5/1992 | European Pat. Off. . |
| 0 530 708 A2 | 3/1993 | European Pat. Off. . |
| 0 560 001 A1 | 9/1993 | European Pat. Off. . |
| 0 623 670 A2 | 11/1994 | European Pat. Off. . |
| 2 153 380 | 8/1985 | United Kingdom . |
| 2 123 846 | 10/1986 | United Kingdom . |
| 2 280 450 | 2/1995 | United Kingdom . |

*Primary Examiner*—Necholus Ogden
*Attorney, Agent, or Firm*—Frishauf, Holtz, Goodman, Langer & Chick, P.C.

[57] ABSTRACT

A pourable aqueous composition for use as, or for dilution to form, a drilling mud comprises a least 2% by weight of a water soluble polyvalent metal salt of an alkyl polyoxyalkylene sulphuric or carboxylic acid, and at least 1% by weight of a corresponding salt of an alkyl benzene sulphuric acid, preferably in the presence of a water soluble inorganic salt or base of said polyvalent metal.

16 Claims, No Drawings

METHOD OF PREPARING A DRILLING FLUID COMPRISING STRUCTURED SURFACTANTS

This application is a Continuation of application Ser. No. 08/356,690, filed Dec. 15, 1994 now abandoned.

The present invention relates to aqueous based surfactant compositions which are, or which are capable of forming, structured surfactant systems, said compositions being especially useful as functional fluids e.g. in drilling operations such as oil field drilling. The present invention especially provides aqueous based surfactant compositions which comprise soluble weighting agents.

INTRODUCTION

Structured surfactant systems have been developed in the detergent art for their ability to suspend solid builders or abrasives, said builders or abrasives typically being present in laundry detergents or hard surface cleaners respectively.

A structured surfactant system is a pourable composition which has the ability to suspend solid particles indefinitely, by virtue of the rheological properties of surfactant mesophases present in the surfactant system.

Structured surfactant systems normally comprise spherulites of surfactant and water in which the former is arranged in a plurality of concentric shells each formed from a bilayer of surfactant molecules. The spherulites are dispersed in a continuous aqueous medium and are packed together to confer on the composition a yield point sufficient to resist any tendency to sedimentation or buoyancy of any solid particles dispersed in the composition, such as to maintain said particles indefinitely in suspension. However the shear stresses created by pouring or stirring the composition exceed the yield point and suffice to break the structure enabling the composition to be poured, pumped and stirred like a normal liquid.

Other surfactant mesophases, whether alone or interspersed with aqueous phase can provide similar rheological properties, for example "G" phase which is liquid crystal Lamellar Phase, of the type also known in the literature as "neat" phase or "lamellar" phase.

Structured surfactant systems are described in GB 2 123 846 and GB 2 153 380 and their use in functional fluids is described in EP-A-0430602.

"Functional fluids" is a term commonly used to embrace lubricants, including drilling and cutting fluids, hydraulic fluids and heat transfer fluids. "Drilling Fluid" is used herein to refer to fluids used in the drilling of bore holes in rock to lubricate and cool drill bits, and to transport rock cuttings away from the rock face. The term is also used herein to include "Spacer Fluids", which are used to clean the sides of bore holes prior to cementing. Drilling Fluids are used in the construction of deep wells and bore holes, and especially oil and gas wells. For convenience the term Drilling Fluids as used herein also embraces "Construction Muds", which are used in civil engineering and the construction industry to stabilise holes and excavations by preventing the breakdown of shales on exposure to water.

Aqueous structured surfactant based compositions, as, or for use in functional fluids are preferred to conventional oil based drilling fluid compositions on environmental grounds.

PRIOR ART

EP-A-0430602 describes aqueous based structured surfactant compositions for use as drilling fluids, particularly for use in bore holes such as oil wells. The compositions of EP-A-0430602 may comprise conventional weighting agents, such as barite or haematite, to provide a composition of the required density. Said weighting agents are substantially insoluble in said compositions and are present as suspended solid particles.

THE PROBLEM

Drilling fluids for use in deep drilling operations are required to have as high a density as possible, and thus it is customary to suspend solid particles of weighting agents, for example barite or haematite, in the drilling fluid, see for example EP-A-0430602. However, such suspensions are unsuitable for use when drilling into oil bearing rock formations themselves, because the solid particles from the drilling fluid tend to block the pores in the rock formation, interfering with the flow of oil from the rock. Therefore there is a need for drilling fluids which contain dissolved weighting agents, for use in the final stages of drilling. Such fluids are referred to as completion fluids. Similar fluids, sometimes referred to as "packing fluids", are often injected into the bore hole to fill the space between the pipe and sides of the hole.

Suitable salts for use as soluble weighting agents include calcium chloride, calcium bromide, zinc bromide, and salts of iron and barium. Unfortunately, it has not been possible hitherto to formulate satisfactory structured surfactants with any of the above salts because the anionic surfactants, such as alkyl benzene sulphonates, which are preferred for use in structured surfactants form insoluble precipitates with polyvalent metals.

THE INVENTION

We have now discovered that aqueous compositions comprising polyvalent metal salts of anionic surfactants present as, or capable of forming, structured surfactants can be obtained by mixing together: a water soluble polyvalent metal salt or polyvalent metal base; and an alkyl benzene sulphonic acid, or a water soluble salt thereof with a weaker base than said polyvalent metal salt or base, in the presence of alkyl ether sulphuric acid or alkyl ether carboxylic acid or a water soluble salt of an alkyl ether sulphuric acid or alkyl ether carboxylic acid.

The salt or base may be added to a mixture of alkyl benzene sulphonic acid and ether sulphate or carboxylate, or preferably, the alkyl benzene sulphonic acid is added to a mixture of base and ether sulphate or carboxylate, to produce the water soluble salt of the alkyl benzene sulphonic acid in situ. Some residual salt or base may be present in the compositions after the neutralisation of the acids.

EMBODIMENTS OF THE PRESENT INVENTION

The present invention provides a pourable aqueous composition comprising at least 2% by weight of a water soluble polyvalent metal salt of a $C_8$–$C_{20}$ alkyl polyalkyleneoxy sulphuric acid or $C_8$–$C_{20}$ alkyl polyalkyleneoxy carboxylic acid, at least 1% by weight of a polyvalent metal salt of a $C_8$–$C_{20}$ alkyl benzene sulphonic acid, and optionally a water soluble, inorganic, salt or base of a polyvalent metal.

Preferably the present invention provides a pourable aqueous composition as aforesaid with at least 1% by weight of said water soluble, inorganic, salt or base, wherein said inorganic salt or base is present in an amount sufficient to form a spherulitic structured surfactant system or a G-phase.

According to a second embodiment the invention provides a method of preparing a composition as aforesaid which comprising reacting a soluble inorganic salt or base of said polyvalent metal with said alkyl benzene sulphonic acid or a water soluble salt thereof which is more weakly basic than said inorganic salt or base in the presence of an aqueous solution of said alkyl polyalkyleneoxy sulphuric or carboxylic acid or a water soluble salt thereof.

A preferred embodiment of the present invention provides the use of a pourable aqueous composition as aforesaid as a functional fluid, especially a drilling fluid.

Surfactants

The polyvalent metal salt of the $C_8$–$C_{20}$ alkyl benzene sulphonic acid, is preferably a calcium or magnesium salt thereof, most preferably a calcium or magnesium salt of a $C_{10}$–$C_{14}$ alkyl benzene sulphonic acid. Other suitable polyvalent metal salts of said acid include the zinc, iron and barium salts, amongst others.

Preferably, the $C_8$–$C_{20}$ alkyl polyalkyleneoxy sulphuric acid or carboxylic acid is a $C_{10}$–$C_{18}$ alkyl polyalkyleneoxy sulphuric acid or carboxylic acid.

Preferably the alkyl polyalkyleneoxy sulphuric or carboxylic acid has an average of from 1 to 50 alkyleneoxy groups, preferably 1.5 to 20, e.g. 2 to 10. Alternatively the polyalkyleneoxy groups may comprise a similar number of propyleneoxy groups or butyleneoxy groups, or of a mixture of ethyleneoxy and propyleneoxy and/or butyleneoxy groups. The polyethyleneoxy group may also comprise one or more glyceryl groups. The number of alkyleneoxy groups is generally higher when the more insoluble polyvalent metals are present. The number of alkyleneoxy groups should be at least sufficient to provide a water soluble salt of the polyvalent metals present.

The relative proportions by weight of alkyl benzene sulphonate and alkyl ether sulphate or alkyl ether carboxylate may vary from 1:15 to 2:1, preferably 1:10 to 1.5:1, most preferably 1:7 to 2:1, especially 1:6 to 1.5:1. Typically the proportion of alkyl ether sulphate or alkyl ether carboxylate is sufficient to maintain the alkyl benzene sulphonate in a liquid or in a fluid mesophase.

The total concentration of surfactant in the composition will typically lie in the range 5 to 25% by weight, e.g. 8 to 20%, especially 10 to 18%.

The surfactant may optionally comprise minor proportions of other anionic or nonionic surfactants such as alkyl sulphates, aryl sulphates, alkyl sulphosuccinamates, alkyl sulphosuccinates, aromatic sulphonates, phosphate esters, olefin sulphonates, paraffin sulphonates, isethionates, taurides, soaps, alcohol alkoxylates, fatty acid ethoxylates, alkyl polyglycosides, sugar esters, amine oxides, alkanolamides, alkyl phenol ethoxylates, ethylene glycol esters, fatty acid dialkylolamides, fatty acid monoalkylolamides, fatty acid monoalkylolamide ethoxylates, or fatty alcohols.

Polyvalent Metal

The polyvalent metal should should be one that forms a water soluble alkyl polyoxyalkylene ethoxylate and is usually divalent or less preferably trivalent, e.g. calcium or magnesium. Other suitable polyvalent metals include zinc, iron and barium. The water soluble, inorganic salt or base may for example be calcium chloride, calcium bromide, calcium bicarbonate, zinc chloride, zinc bromide, barium chloride, ferric chloride calcium hydroxide or barium hydroxide. The electrolyte may additionally comprise alkali metal or ammonium salts such as sodium chloride, ammonium chloride, sodium bromide, potassium chloride or caesium iodide. Normally a single polyvalent metal will be used in any given composition, however mixed metalions may be used and may be added during the preparation together or in any order.

The concentration of said water soluble, inorganic polyvalent metal salt or base may be from 0 to 70% by weight of the composition, preferably 0.5 to 60%, e.g. 1 t 50%, especially 2 to 45%. Said salt or base is preferably present in the composition in an amount up to saturation, however in certain compositions the concentration of salt or base may exceed the saturation level, whereby the excess may be present as undissolved material suspended in said composition.

The compositions of the invention preferably contain sufficient surfactant and dissolved electrolyte to form a stable structured (e.g. lamellar or spherulitic) surfactant system. Such systems may optionally be used to suspend solid weighting agents such as calcite, barite, calcium sulphate, barium sulphate, haematite, iron carbonate, galena or other dense minerals or insoluble salts. Although not generally preferred, suspended solid salts or bases may be present in any proportion consistent with maintaining a pourable composition e.g. up to 70%, more usually less than 50%, typically less than 20%. The compositions in use normally contain suspended mineral particles such as shale or other rock cuttings.

Density, Initial Yield, Viscosity

The densities of the compositions of the present invention typically lie within the range 0.8 $gcm^{-3}$ to 3.0 $gcm^{-3}$, preferably 0.9 $gcm^{-3}$ to 2.5 $gcm^{-3}$, most preferably 1.0 $gcm^{-3}$ to 2.0 $gcm^{-3}$ dependent upon the conditions encountered during the drilling operation. However, the density of the composition whilst being sufficient to ensure efficient drilling and to provide the required rheological characteristics, should not be so great as to hamper the circulation of the composition during the drilling operation.

The viscosity at a shear rate of 21 $s^{-1}$ of the compositions typically lie within the range 0.01 Pas to 3.0 Pas at 20° C., preferably 0.02 to 2.0, most preferably 0.05 to 1.5, as measured on a controlled shear stress rheometer.

The initial yield of the compositions of the present invention is preferably sufficient to support solid matter, such as particles of shale, indefinitely. Preferably the initial yield of the compositions lies in the range 0.01 to 4.0 $NM^{-2}$, preferably 0.02 to 2.0, most preferably 0.03 to 1.0 $NM^{-2}$.

Production of Drilling Muds

The surfactants and salts may optionally be supplied to the drilling site as preformed muds or as structured surfactant systems, preferably spherulitic systems, at typical use concentrations. Said systems may be weighted to the desired density prior to use.

The surfactants and salts may optionally be supplied as unstructured surfactant systems, which may optionally have electrolyte and/or water added prior to use to provide a structured surfactant system or as individual components for the preparation of the compositions and weighting thereof on site prior to use.

Preferably the surfactants and salts may optionally be supplied as concentrated compositions according to the invention which form structured surfactant systems on dilution. Optionally, electrolyte may be added to increase the density of the composition and/or to aid the production of the structured surfactant system. Said concentrates are easily diluted to produce compositions of typical use strength, enabling the dilution to be affected on site prior to use. Particularly preferred are compositions adapted to form stable structured surfactant systems on dilution with brine (e.g. sea water), or with aqueous solutions of calcium or other polyvalent metal salts. Such concentrates may contain high levels of surfactant e.g. 30 to 70% by weight, more usually 35 to 60% e.g. 40 to 50%.

Compositions of the present invention therefore include concentrates adapted to be diluted to form drilling muds, drilling muds weighted with solid weighting agents, substantially solid-free completion and packing fluids, spacer fluids, and spent or recycle muds containing suspended rock cuttings.

The compositions may be modified by adding deffloculating polymers in order to improve viscosity and or stability. For example alkyl end stopped poly sulphonates or highly ethoxylated (eg. 20 to 50 mole Eto $C_{8-20}$ alcohols may be used as may alkyl polyglycosides with a high degree of polymerisation eg. greater than 3 more preferably greater than 6. Suitable deflocculants are discussed in EPO 623 670A2.

A characteristic feature of the compositions of the present invention is the tolerance of the systems to a wide range of electrolyte concentrations. Stable spherulitic, solid-suspending compositions are typically obtained at most concentrations of dissolved electrolyte between about 1 and about 45% by weight and sometimes in the total absence of dissolved electrolyte.

The pH of the composition may be controlled by adding bases such as lime or barium hydroxide. Compositions of our invention may contain anticorrosives such as phosphonocarboxylic acids, polyamine methylene phosphonates or alkyl polyoxyalkylene polycarboxylates, biocides such as tetrakis (hydroxymethyl) phosphonium salts or glutaraldehyde and antifoams such as silicones.

The invention will be further illustrated by way of the following examples.

EXAMPLE 1

A base composition was prepared by neutralising in water an alkyl ether sulphuric acid with CaO to form the calcium salt of the alkyl ether sulphuric acid (hereinafter referred to as CaAES0). Excess CaO and a silicon defoamer were then added to the aqueous CaAES and finally an alkyl benzene sulphonic acid was added to the mixture to form the Calcium salt of alkyl benzene sulphonic acid (hereinafter referred to as CaAES) in situ.

A series of compositions were prepared from the base composition comprising water, 10% wt/wt calcium $C_{12-24}$ alkyl 3 mole ethoxy sulphate (CaAES), 5% wt/wt calcium $C_{12-14}$ linear alkylbenzene sulphonate ("CaLABS"), and 0.1% silicone defoamer. To these compositions progressively larger amounts of calcium chloride dihydrate were added from 0% up to 45% wt/wt.

The compositions were stable and spherulitic at all levels of calcium chloride dihydrate addition between 15% and 38% by weight. Signs of instability were observed above 40% by weight of the calcium chloride. The density of the compositions at 38% calcium chloride was 1.25 gcm$^3$.

EXAMPLE 2

Example 1 was repeated using a base solution having the composition:

|  | % wt/wt |
|---|---|
| CaAES | 12% |
| CaLABS | 2.5% |
| silicone defoamer | 0.5% |
| water | balance |

The composition was stable and spherulitic for calcium chloride dihydrate additions between 15% and 39% wt/wt.

EXAMPLE 3

Example 1 was repeated using a base solution having a composition:

|  | % wt/wt |
|---|---|
| CaAES | 14.5 |
| CaLABS | 3.0 |
| Silicone defoamer | 1.0 |
| water | balance |

The composition was stable and spherulitic for calcium chloride dihydrate additions between 0% and 25% wt/wt.

EXAMPLE 4

Example 1 was repeated using a base solution having the composition:

|  | % wt/wt |
|---|---|
| CaAES | 9.2 |
| CaLABS | 4.2 |
| Silicone defoamer | 0.5 |
| water | balance |

The composition was stable and spherulitic for calcium bromide dihydrate additions between 36% and 65% wt/wt. Densities of up to 1.6 g.Cm$^3$ were obtained.

EXAMPLE 5

Example 4 was repeated but with a base solution having the composition:

|  | % wt/wt |
|---|---|
| CaAES | 12 |
| CaLABS | 6 |
| Silicone defoamer | 0.75 |
| water | balance |

The composition was stable and spherulitic for calcium bromide dihydrate additions between 15% and 65% wt/wt.

EXAMPLE 6

A base composition was prepared by neutralising in water an alkyl ether sulphuric acid with MgO to form the Mg salt of the alkyl ether sulphuric acid (hereinafter "Mg AES"). CaO and silicone defoamer were added to the aqueous MgAES and finally alkyl benzene sulphonic acid was added to form CaLABS in situ.

A series of compositions were prepared from the base composition wherein the base composition comprised:

|  | % wt/wt |
|---|---|
| Mg AES | 9.2 |
| Ca LABS | 4.2 |
| Silicone defoamer | 0.5 |
| water | balance |

The composition was stable and spherulitic for calcium chloride dihydrate additions between 10% and 40% wt/wt.

EXAMPLE 7

The composition of Example 4, with the addition of 34% wt/wt calcium chloride dihydrate provides a functional fluid which is stable and spherulitic.

pH=10.0 initial yield=0.73 $NM^{-2}$ viscosity @21 $s^{-1}$ shear rate=0.47 Pa S.

Density=1.1 $gcm^{-3}$.

EXAMPLE 8

Example 1 was repeated using a base solution having the composition:

|  | % wt/wt |
|---|---|
| CaAES | 14.5% |
| CaLABS | 8% |
| Silicone defoamer | 0.5% |
| water | balance |

The composition was a 1.5×concentrate. The composition was stable and spherulitic for calcium chloride dihydrate additions of 4% by weight, and was a viscous, predominantly G-phase composition for calcium chloride dihydrate additions of 31% by weight.

The 4% calcium chloride dihydrate concentrated product was easily diluted to produce a stable product of typical working concentration. Further additions of calcium chloride dihydrate were made to produce a functional fluid of the required density comprising less than 31% by weight of calcium chloride dihydrate.

EXAMPLE 9

Two drilling muds were formulated comprising in wt. %:

|  | A | B |
|---|---|---|
| Calcium $C_{12-14}$ alkyl 3 mole ethoxy sulphate | 6.8 | 6.7 |
| Calcium oxide | 0.8 | 0.8 |
| Water | 54.5 | 53.6 |
| Silicone antifoam | 0.2 | 0.4 |
| Calcium chloride dihydrate | 34.1 | 34.0 |
| Calcium $C_{12-14}$ alkylbenzene sulphonic acid | 3.6 | 3.9 |
| Calcium $C_{12-14}$ 20 mole ethoxylate (stabiliser) | 0 | 1.2 |

Sample A was highly flocculated, giving a viscoelastic fluid which gelled instantly on being sheared by stirring at 300 rpm. Prior to shearing A had a initial yield point of 0.1 N and a viscosity at 21 $sec^{-1}$ of 0.5 Pas. The viscosity fell under increased shear to a substantially constant viscosity of 0.17 Pas.

In contrast the sample B containing the stabiliser was a stable, fluid having an initial yield point of 0.1 N and a viscosity at 21 $sec^{-1}$ of 0.55 Pas rising with increasing shear to a constant value of 0.09 Pas.

After mixing at 300 rpm for 15 minutes the product had an initial yield of 0.17 N, and viscosity 21 $sec^{-1}$ of 0.38 Pas falling to a constant value of 0.087 Pas at higher shear rates. The composition was suitable for use as a drilling mud, spacer fluid, completion fluid or packing fluid.

EXAMPLE 10

A drilling mud formulation was prepared as follows:

|  | Wt % |
|---|---|
| Calcium $C_{12-14}$ alkyl 3 mole ethoxy sulphate | 6.7 |
| Calcium oxide | 0.8 |
| $H_2O$ | 51.8 |
| Silicone antifoam | 0.4 |
| Calcium chloride dihydrate | 34.0 |
| $C_{12-14}$ alkylbenzene sulphonic acid | 3.9 |
| Poly AMPS stabiliser* | 3.0 |

*The stabiliser was a polymer of 2-acrylamido-2-methylpropane sulphonic acid having a mean degree of polymerisation of 12.

* The stabiliser was a polymer of 2-acrylamido-2-methylpropane sulphonic acid having a mean degree of polymerisation of 12.

The product was stable and had an initial yield of 0.17N, a viscosity of 21 $sec^{-1}$ of 1.7 Pas and a steady viscosity of 0.13 Pas. After 15 minutes at 300 rpm the initial yield point was 0.3N and the viscosity at 21 $sec^{-1}$ was 1.0 Pas falling to a steady value of 0.9 Pas at increasing shear.

What is claimed is:

1. A method for preparing a drilling fluid consisting essentially of a pourable aqueous composition containing an aqueous structured surfactant, together with at least one weighting agent, said method comprising (a) obtaining a concentrate which consists essentially of water and, in a concentration sufficient to form a mobile G-phase,
      (i) a water soluble, polyvalent metal salt of an alkyl ether acid selected from the group consisting of $C_8$–$C_{20}$ alkyl polyalkleneoxy sulphuric acid and $C_8$–$C_{20}$ alkyl polyalkyleneoxy carboxylic acid having in each case from 1 to 50 ethyleneoxy groups; (ii) a polyvalent metal salt of a $C_8$–$C_{20}$ alkyl benzene sulphonic acid; and (iii) said at least one weighting agent; and (b) adding to said concentrate sufficient water to form a spherulitic composition;

wherein said water soluble polyvalent metal salt of an alkyl ether acid (i) and said polyvalent metal salt of a $C_8$–$C_{20}$ alkyl benzene sulphonic acid (ii) are surfactant components, present to form said aqueous structured surfactant;

said at least one weighting agent consists essentially of a water soluble inorganic polyvalent metal salt selected from the group consisting of calcium chloride, calcium bromide, zinc chloride, zinc bromide, barium chloride and ferric chloride, or a water soluble inorganic polyvalent metal base selected from the group consisting of calcium hydroxide and barium hydroxide; and said spherulitic composition contains at least 2% by weight of said water soluble polyvalent metal salt (i), at least 1% by weight of said polyvalent metal salt (ii) and at least about 34% by weight of said at least one weighting agent.

2. A method according to claim 2 wherein the drilling fluid is prepared having a density between 0.8 gcm$^{-3}$ and 3.5 gcm$^{-3}$.

3. A method according to claim 2 wherein the drilling fluid is prepared having a density of from 1.0 to 2.0 gcm$^{-3}$.

4. A method according to claim 1 wherein, in said polyvalent metal salt of an alkyl ether acid (i) and in said polyvalent metal salt of an alkyl benzene sulphonic acid (ii), each of said polyvalent metals is selected from the group consisting of Ca, Mg, Zn, Ba and Fe.

5. A method according to claim 1 wherein said polyvalent metal salt of said alkyl benzene sulphonic acid (ii) and said polyvalent metal salt of said alkyl polyalkyleneoxy sulphuric acid or carboxylic acid (i) are present in a weight ratio of from 1:15 to 2:1.

6. A method according to claim 1 wherein the total amount of said water soluble, polyvalent metal salt of an alkyl ether acid (i) and said polyvalent metal salt of a $C_8$–$C_{20}$ alkyl benzene sulphonic acid (ii) is from 5 to 25% by weight based on the total weight of the fluid.

7. A method according to claim 1 wherein said drilling fluid additionally comprises a minor proportion based on the total weight of said water soluble polyvalent metal salt of an alkyl ether acid (i) and said polyvalent metal salt of a $C_8$–$C_{20}$ alkyl benzene sulphonic acid (ii) of other anionic or non-ionic surfactants.

8. A method according to claim 1, wherein the concentration of said at least one weighting agent is from about 34% to 45% based on the total weight of said fluid.

9. A method according to claim 1 wherein said drilling fluid additionally has added suspended solids.

10. A method according to claim 9 wherein said suspended solids consist essentially of an excess of said polyvalent metal salt or base, a substantially water insoluble weighting agent and/or rock cuttings.

11. A method according to claim 1 which comprises forming said concentrate by reacting a water soluble polyvalent metal salt or base with an alkyl benzene sulphonic acid or a water soluble salt thereof which is more weakly basic than said polyvalent metal salt or base, in an aqueous medium containing said alkyl ether acid or a water soluble salt thereof.

12. A method according to claim 1 wherein said polyvalent metal salt is a salt of an alkyl ether acid.

13. A method according to claim 1 wherein said concentrate contains or has added thereto sufficient polyvalent metal salt and/or base to provide a drilling fluid having a density greater than 0.9 cm$^{-3}$.

14. A method according to claim 1 wherein each of said polyvalent metals is selected from the group consisting of Ca, Mg, Zn, Ba and Fe.

15. A drilling fluid according to claim 8 wherein said concentration is from 34% to 39%.

16. A drilling fluid according to claim 8 wherein said concentration is about 34%.

* * * * *